United States Patent Office 2,939,804
Patented June 7, 1960

2,939,804

RESIN PARTICLE COATED WITH METAL

Frederick V. Schossberger, Hinsdale, Donald K. Werle, Franklin Park, and Michael Michalchik, Chicago, Ill., assignors, by mesne assignments, to UARCO Incorporated, a corporation of Illinois No Drawing. Filed Jan. 23, 1958, Ser. No. 710,607

5 Claims. (Cl. 117—71)

This invention relates to coated particles and more particularly to pressure and heat sensitive particles which are capable of receiving a chemical nickel coating and methods for making the same.

Small particles of nonmetallic material are often used to provide a surface coating on paper or other sheet materials. In many instances it is desirable that these small particles be thermoplastic in nature so that they are pressure and heat sensitive and therefore turn to a liquid when heated or collapse when subjected to pressure. For example, such particles are useful in producing pressure sensitive manifolding sheets.

In the use of such small particles it has often been desirable to have particles which retain these characteristics of thermoplasticity but will also accept or conduct a charge of electricity. For example, such particles are well adapted for use in electrophotography wherein electrical charges are imposed on a sheet surface conforming to a predetermined image and thereafter electrically sensitive particles are deposited on the sheet. These particles may also be useful when it is desirable to create a coating capable of conducting electricity and also capable of undergoing substantial color change. Thus these particles which are heat sensitive may be heated to change them to liquid state thereby breaking the exterior metallic coating and providing a color change due to the difference in color between the exterior coating and the particle itself.

In providing small particles of this nature with the property of electrical conductivity and more preferably with an electrically sensitive surface coating, problems have been encountered in the past. Thus it has generally been considered impractical, if not impossible, to provide a satisfactory coating of a metallic character and more particularly of metallic nickel on a thermoplastic material. This has been so, even though processes for nickel coating of other nonmetallic materials have been known for some time.

This problem may be overcome, however, by the process of this invention which involves depositing first, a thin discontinuous coating of metallic copper on a thermoplastic particle and then subjecting the particle to catalytic palladium. Thus the coated particle may be immersed in a palladium containing solution which causes a small amount of palladium to be substituted for the copper. This copper-palladium coating then satisfactorily activates or catalyzes a nickel coating solution to provide a suitable electrically conductive metallic coating on the particle.

It is the primary object of this invention to provide a method whereby a metallic coating may be obtained upon thermoplastic particles.

It is another object of this invention to provide a pressure and heat sensitive thermoplastic particle which is capable of being chemically coated with metallic nickel.

It is a further object of this invention to provide a method for preparing the surface of a pressure and heat sensitive thermoplastic particle for chemical nickel coating.

Other objects and advantages of this invention will be apparent from the following description.

The thermoplastic particles which are useful in this invention are those which may be softened by heat and then regain their original properties upon cooling. Examples of thermoplastic materials which may be satisfactorily used are coal pitch, acrylate resins, polystyrene, and polyethylene. The acrylate resins mentioned are synthetic resins formed by polymerization of acrylic acid or one of its simple derivatives or mixtures containing these acids, usually with benzoyl peroxide or a similar material as a catalyst. However, the preferred material for this invention is coal pitch.

Of course, it is not meant to limit this invention to these mentioned materials since almost any thermoplastic material may be used. The most important limiting factor which determines which thermoplastic materials may be used is the amount of heat necessary to cause the process to take place. Thus, if the melting point of the material is lower than this heat it would be difficult to coat the materials.

The particles of thermoplastic material useable in this invention may be prepared in any of a number of ways and are usually relatively small in size. Thus for example, practical and acceptable particle size is from about 100 to 325 mesh. It is also desirable that the particles be spherical in nature. Particles of this nature made from, for example, coal pitch may be obtained by dispersing the pitch as an aerosol in a heated furnace. As the air borne particles settle in the furnace they assume a spherical shape and may be collected as such as they fall into a cool air stream.

It is also desirable to preclean the particles to remove unwanted grease or other deleterious impurities. This may be done by using a strong alkaline soap or by immersing its particles in a boiling Fehling solution, the composition of which will be explained next.

As previously pointed out, it is necessary for the purpose of this invention, to provide a thin discontinuous layer of copper on the surface of the particles. Normally this will be best achieved by immersing the particles in a solution containing a copper salt and then reducing the copper to its metallic state thereby causing it to plate out on the immersed particles. As an example of such a copper solution, a testing mixture commonly called Fehling solution may be used. Such a Fehling solution may be made up in the following composition:

I

| | Weight, gm./l. |
|---|---|
| Copper sulphate, $CuSO_4.5H_2O$ | 35 |
| Sodium potassium tartrate, $NaKC_4H_4O_6$ | 173 |
| Sodium hydroxide, $NaOH$ | 52 |

Any satisfactory substance which will cause reduction of the copper from the Fehling solution above mentioned would be satisfactory. However, the reducing sugars such as dextrose, inverted sucrose, lactose or maltose are well suited for this purpose. Thus, it is only necessary to use a small amount of one of these sugars, for example, from about 10 to 15% by weight of the Fehling solution to provide satisfactory reduction and sufficient copper coating on the particles. In order to obtain sufficient copper coating, it is also desirable to heat the solution containing the particles to the boiling point for about 1 to 2 minutes.

After the copper coating has been satisfactorily applied to the thermoplastic particles, they then are immersed in a solution containing a palladium salt. As a result of this, a portion of the copper coating will be oxidized and go into the solution while a portion of the palladium salt will be reduced to the metallic state and be combined with the copper coating. A satisfactory solution for this purpose may be made up using palladium chloride in an amount of about 100 p.p.m.

After the particles have been treated with palladium so that they are coated with a mixed coating of copper and palladium, they are ready for nickel coating. Such a coating may be satisfactorily provided by immersing the particles in a plating bath such as a Bureau of Standards plating bath which is made up as follows:

II

| | Gm./l. |
|---|---|
| Nickel chloride $NiCl_2.6H_2O$ | 30 |
| Sodium hypophosphite $Na(H_2PO_2).H_2O$ | 10 |
| Sodium hydroxyacetate $NaC_2H_3O_3$ | 50 |

Superior results are obtained using such a plating bath if it is heated slightly during plating.

As an example of the process of this invention, a quantity of coal pitch was crushed and sieved and the 100–325 mesh fraction was converted into spherical particles by dispersing them as an aerosol in a tubular heated furnace at a temperature of 600° C. As the air borne particles settled in the furnace, they melted and assumed a spherical shape. The bottom of the furnace was open so that the molten spheres fell into a cool air stream and solidified before settling on a collecting surface. Eleven grams of these freshly prepared spheres thus collected were cleaned by boiling for 5 minutes in a 250 ml. beaker containing 150 ml. of freshly prepared Fehling solution made up as previously recited. The solution was then allowed to cool to room temperature and 15 grams of dextrose was added. After the dextrose dissolved, the contents of the beaker was slowly heated until the solution was brought to the boiling point and held there for about 2 minutes. During the heating of the beaker, the contents were stirred continuously with an electrically driven stirrer.

The copper coated spheres were then rinsed by repeated dilution and decantation in distilled water. The rinsed spheres were then immersed for 1 minute in a solution containing 100 p.p.m. of palladium chloride. Following this immersion they were again rinsed by dilution and decantation. The copper-palladium coated pitch particles were then nickel coated by immersion at room temperature in the Bureau of Standards plating bath made up as previously recited. The bath was slightly heated with stirring to 90° C. After 10 minutes at this temperature a bright continuous nickel coating was deposited uniformly on the pitch spheres.

The foregoing detailed description has been given for clearness of understanding only, and no unnecessary limitations should be understood therefrom, for some modifications will be obvious to those skilled in the art.

We claim:

1. A coated, pressure and heat sensitive particle comprising: a resinous thermoplastic substance having an intermediate coating of metallic copper containing a small amount of metallic palladium and an outer coating of metallic nickel.

2. A coated, pressure and heat sensitive particle comprising: a resinous thermoplastic substance having an intermediate coating comprising a thin, discontinuous coating of metallic copper containing a small amount of metallic palladium and a thin, continuous outer coating of metallic nickel.

3. A coated, pressure and heat sensitive particle comprising: a resinous thermoplastic substance having an intermediate coating comprising a thin, discontinuous coating of metallic copper containing a small amount of metallic palladium and a thin, continuous outer coating of metallic nickel, said particle having a size ranging from about 100 to about 325 mesh.

4. A coated, pressure and heat sensitive particle comprising: a resinous thermoplastic substance which is a member of the class consisting of coal pitch, acrylate resins, polystyrene, and polyethylene, said substance having an intermediate coating comprising a thin, discontinuous coating of metallic copper containing a small amount of metallic palladium and a thin, continuous outer coating of metallic nickel, said particle having a size ranging from about 100 to about 325 mesh.

5. A coated, pressure and heat sensitive particle comprising: coal pitch having an intermediate coating comprising a thin, discontinuous coating of metallic copper containing a small amount of metallic palladium and a thin, continuous outer coating of metallic nickel, said particle having a size ranging from about 100 to about 325 mesh.

References Cited in the file of this patent

UNITED STATES PATENTS

| 2,430,581 | Pessel | Nov. 11, 1947 |
| 2,690,402 | Crehan | Sept. 28, 1954 |
| 2,757,104 | Howes | July 31, 1956 |
| 2,761,854 | Coler | Sept. 4, 1956 |
| 2,788,297 | Louis | Apr. 9, 1957 |

FOREIGN PATENTS

| 606,437 | Great Britain | Aug. 13, 1948 |